United States Patent
Xu et al.

(10) Patent No.: US 12,398,045 B2
(45) Date of Patent: Aug. 26, 2025

(54) DEVICE AND METHOD FOR PREPARING SULFITE

(71) Applicants: NANJING GEKOF INSTITUTE OF ENVIRONMENTAL PROTECTION TECHNOLOGY & EQUIPMENT CO., LTD., Jiangsu (CN); NANJING TECH UNIVERSITY, Jiangsu (CN); JIANGSU DEYITONG ENVIRONMENTAL PROTECTION TECHNOLOGY CO., LTD., Jiangsu (CN); NANJING LIUYAN ENVIRONMENTAL PROTECTION TECHNOLOGY CO., LTD., Jiangsu (CN)

(72) Inventors: Haitao Xu, Nanjing (CN); Yanzhong Xu, Nanjing (CN); Mingbo Li, Nanjing (CN); Renyuan Chen, Nanjing (CN); Dahua Liu, Nanjing (CN); Junmin Li, Nanjing (CN); Jing Song, Nanjing (CN)

(73) Assignees: NANJING GEKOF INSTITUTE OF ENVIRONMENTAL PROTECTION TECHNOLOGY & EQUIPMENT CO., LTD., Jiangsu (CN); NANJING TECH UNIVERSITY, Jiangsu (CN); JIANGSU DEYITONG ENVIRONMENTAL PROTECTION TECHNOLOGY CO., LTD., Jiangsu (CN); NANJING LIUYAN ENVIRONMENTAL PROTECTION TECHNOLOGY CO., LTD., Jiangsu (CN)

( * ) Notice: Subject to any disclaimer, the term of this patent is extended or adjusted under 35 U.S.C. 154(b) by 882 days.

(21) Appl. No.: 17/626,109

(22) PCT Filed: Apr. 22, 2020

(86) PCT No.: PCT/CN2020/086213
§ 371 (c)(1),
(2) Date: Jan. 10, 2022

(87) PCT Pub. No.: WO2021/004122
PCT Pub. Date: Jan. 14, 2021

(65) Prior Publication Data
US 2022/0259059 A1    Aug. 18, 2022

(30) Foreign Application Priority Data
Jul. 10, 2019    (CN) .......................... 201910621098.5

(51) Int. Cl.
*C01D 5/14*    (2006.01)
(52) U.S. Cl.
CPC .................................. *C01D 5/145* (2013.01)
(58) Field of Classification Search
CPC .................................. C01D 5/14; C01D 5/145
See application file for complete search history.

(56) References Cited

U.S. PATENT DOCUMENTS

| 4,385,039 A | 5/1983 | Lowell et al. |
| 4,588,567 A | 5/1986 | Miller |

(Continued)

FOREIGN PATENT DOCUMENTS

| CN | 102659142 A | 9/2012 |
| CN | 102659143 A | 9/2012 |

(Continued)

OTHER PUBLICATIONS

Jul. 15, 2020 Search Report issued in International Patent Application No. PCT/CN2020/086213.

*Primary Examiner* — Anthony J Zimmer
*Assistant Examiner* — Eric Scott Sherman
(74) *Attorney, Agent, or Firm* — Oliff PLC

(57) ABSTRACT

A device for preparing a sulfite includes: a mother liquid tank and alkaline bin connected to a concentrated alkaline tank, connected to a tower reactor first reactor, one first reactor bottom output end is connected to a first gas-and-liquid mixer and another to a bubbling reaction kettle upper end, a bubbling reaction kettle gas output end is connected to the first mixer being connected to a first reactor upper (Continued)

portion; first reactor upper portion gas and second reactor bottom output ends are connected to a second mixer being connected to the second reactor top; and the bubbling reaction kettle is connected to a centrifugal machine or the alkaline tank, the machine being connected to a wet material bin and the liquid tank. A method includes preparing main and auxiliary absorption liquids, generating a middle slurry, reabsorbing residual gas $SO_2$, generating a target product, separating the target product, drying and packaging.

3 Claims, 1 Drawing Sheet

(56) References Cited

U.S. PATENT DOCUMENTS

| | | | | |
|---|---|---|---|---|
| 5,270,015 | A | * | 12/1993 | Rochelle .............. B01D 53/501 96/136 |
| 2010/0008845 | A1 | | 1/2010 | Kisielewski et al. |

FOREIGN PATENT DOCUMENTS

| | | |
|---|---|---|
| CN | 202785692 U | 3/2013 |
| CN | 104211092 A | 12/2014 |
| CN | 104386714 A | 3/2015 |
| CN | 105293533 A | 2/2016 |
| CN | 105565343 A | 5/2016 |

\* cited by examiner

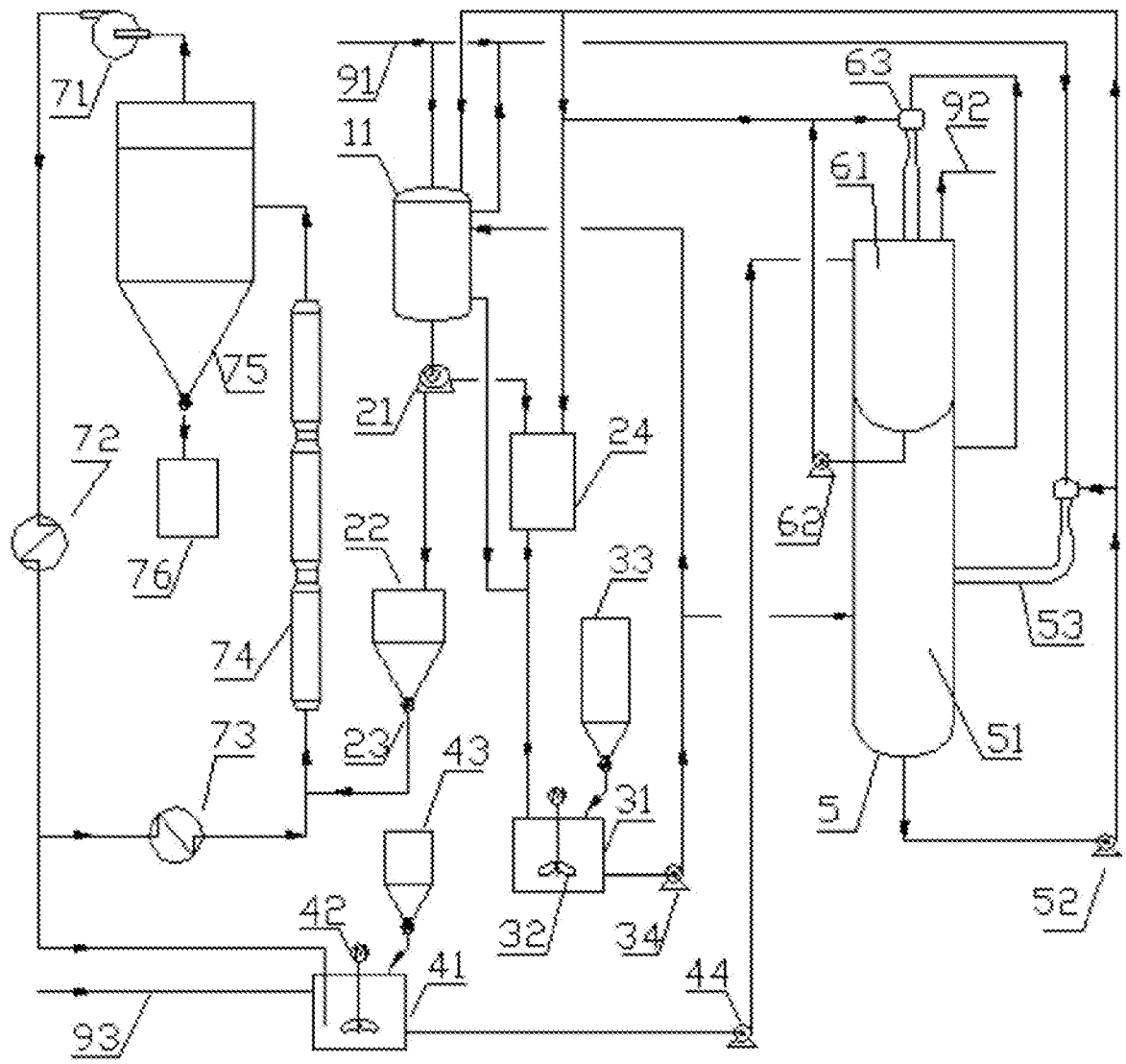

1

DEVICE AND METHOD FOR PREPARING SULFITE

TECHNICAL FIELD

The present invention relates to the field of chemical engineering, and specifically, to a device and method for preparing sulfite.

BACKGROUND

With the advancement of environmental protection technology, the flue-gas desulfurization technology of recovery methods has been developed rapidly. In the past, the supply and demand of the sulfuric acid industry were tight, and the $SO_2$ as a by-product produced by desulfurization was mainly used to prepare sulfuric acid. Nowadays, the sulfuric acid industry has serious overcapacity and almost no profit. For example, the high-concentration $SO_2$ regeneration gas was produced as a by-product in an absorber regeneration link in the activated coke desulfurization process, organic amine desulfurization process, citric acid desulfurization process, and other desulfurization process, and it is no longer economically desirable to continue to use such sulfur-containing gas to produce sulfuric acid. Based on economic goals as the ultimate result orientation, some companies have explored the direction of preparing sulfates. China is the country with the largest sulfite production and sales. The production capacity of sulfite products such as sodium metabisulfite, ammonium sulfite, sodium sulfite, and sodium dithionate accounts for more than 60% of the total production capacity of corresponding products in the world, and the production of some products even accounts for more than 80% of the production of corresponding products in the world. From the analysis of the dual factors of technology and economy, the best way to resolve the foregoing $SO_2$ is to produce sulfite. Disulfurous acid, sodium sulfite, ammonium sulfite, ammonium bisulfite, potassium metabisulfite, sodium thiosulfate, sodium dithionate, etc. are currently the most promising sulfite products. The preparation of sodium metabisulfite products is used as an example. Existing process technologies all have the problems of not making good use of $SO_2$, many reaction by-products, serious environmental pollution, high production cost, poor product quality, not suitable for current food safety and environmental protection requirements. The existing or implemented patented technologies include the following:

A method for producing sodium metabisulfite by a pure oxygen method disclosed by the patent CN 201510806211.9 uses pure oxygen and elemental sulfur as raw materials. Although the purity of the product is better than that of other processes, the cost of obtaining pure oxygen and elemental sulfur is very high, the raw material cost accounts for a large proportion of the production cost, and the market competitiveness is weak.

A method for preparing food-grade sodium metabisulfite disclosed by the patent CN 201410638160.9 uses a process route of recrystallization. Theoretically, the purity of primary recrystallization can reach 98.5% or more. Due to the steps of evaporation and crystallization and secondary drying of the product, the product has high comprehensive energy consumption, very high unit cost, and weak market competitiveness.

A method for producing sodium metabisulfite or sodium sulfite with gypsum as a raw material disclosed by the patent CN 201210148524.6 uses $SO_2$-containing flue gas decomposed by gypsum as a raw material for preparing sulfite. Although resource reuse is realized, the cost of obtaining $SO_2$ is higher than the cost of purchasing elemental sulfur, and the discharge of waste water and exhaust gas is large, and the secondary pollution is serious. Due to lack of the basic elements of sustainable operation, the production lines currently on the market that use such technology have been shut down.

A sodium metabisulfite production system disclosed by the patent CN 201220290827.7 uses a one-stage bubbling reactor and a two-stage Venturi empty tower absorber as reactors, and its system power consumption is significantly reduced compared with other technologies. However, the oxidation rate of a drying link and a tail washing link of the product is high, and the product quality is not high.

A production process for preparing sodium metabisulfite from pyrite disclosed by the patent CN 201410418249.4 uses pyrite as a sulfur source to produce sodium metabisulfite and sodium sulfite. Although the cost of obtaining sulfur is lower than that of the sulfur method, the by-product red iron oxide and steam have a high industrial added value, and the product profit is better than that of the sulfur method, the content of arsenic, iron, and heavy metals in the product is not easy to control, which is difficult to meet the technical preparation of food-grade products stably for a long time. In addition, for the product, the drying technology with hot air as a drying medium is used, and a three-stage bubbling reaction kettle is used, resulting in high gas pressure loss and high product unit comprehensive energy consumption. Moreover, due to the large waste water output and high environmental protection investment costs, the profit rate is also reduced greatly.

SUMMARY

The technical problem to be resolved by the present invention is to provide a device and a method for preparing sulfite, which can use industrial sulfur-containing waste gas such as activated coke desulfurization regeneration gas, organic amine ion liquid desulfurization regeneration gas, and citric acid desulfurization regeneration gas as sulfur sources to produce products such as sodium metabisulfite, sodium sulfite, ammonium sulfite, and ammonium bisulfite, and has low product unit comprehensive energy consumption and high product purity during the production.

To achieve the objective of the present invention, the present invention uses the following technical solution, including the following:

A device for preparing sulfite is provided, where output ends at the bottom of a mother liquor tank and an alkali storage A are connected to a concentrated alkali tank, a output end of the concentrated alkali tank is connected to a first-stage reactor of a column reactor, one output end at the bottom of the first-stage reactor is connected to a first-stage gas-liquid mixer, the other output end is connected to a bubbling reactor, a gas output end at the top of the bubbling reactor is connected to the first-stage gas-liquid mixer, the first-stage gas-liquid mixer is also connected to the top of the first-stage reactor, a gas output end at the top of the first-stage reactor and an output end at the bottom of a second-stage reactor are connected to a second-stage gas-liquid mixer, and the second-stage gas-liquid mixer is connected to the top of the second-stage reactor;

a liquid-phase output end at the bottom of the bubbling reactor is connected to a centrifuge, a solid output end of the centrifuge is connected to a wet silo, and a liquid output end of the centrifuge is connected to the mother liquor tank; and an output end of the wet silo is connected to a dryer, an output end at the top of the dryer is connected to a baghouse dust collector, and an output end at the bottom of the baghouse dust collector outputs a target product.

In the technical solution of the present invention: a gas-phase output end of the baghouse dust collector is connected to a cooler by an induced draft fan, a gas output pipeline of the cooler is connected to the bottom of the dryer by a heater, a liquid output pipeline of the cooler is connected to a dilute alkali tank, and an output end of the dilute alkali tank is connected to the second-stage reactor.

A method for preparing sodium metabisulfite by using the foregoing device is provided, including the following steps:

1) preparation of main absorption liquid: preparing a thick slurry with a temperature of 45-57° C. and a relative density of 1.28-1.35 in the concentrated alkali tank from desalted water and sodium carbonate when the device runs for the first time or after a major repair; and preparing a thick slurry with a temperature of 42-57° C. and a relative density of 1.45-1.55 in the concentrated alkali tank by using a mother liquor of saturated sodium bisulfite as a solvent and sodium carbonate as a solute in the normal production process, and supplementing the insufficient solvent with steam condensate, desalted water, etc.;
2) preparation of auxiliary absorption liquid: dissolving sodium carbonate with desalted water and condensed water from a drying system to prepare a dilute lye with a temperature of 42-57° C. and a relative density of 1.25-1.33 in a dilute alkali tank;
3) production of intermediate slurry: transferring the prepared slurry in step 1) into the first-stage reactor of the column reactor by using a concentrated alkali pump to undergo counter-current contact reaction with the residual gas from the bubbling reactor ($SO_2$ gas) to produce an intermediate slurry of sodium sulfite and sodium bisulfite;
4) re-absorption of residual $SO_2$ gas: transferring the dilute lye prepared in step 2) into the second-stage reactor of the column reactor by using a dilute alkali pump to react with residual gas from the first-stage reactor (51) to produce a tail washing slurry of sodium sulfite and sodium bisulfite;
5) production of target product: transferring the intermediate slurry obtained in step 3) into the bubbling reactor to react with fresh $SO_2$ raw material gas, and precipitating sodium metabisulfite crystals when the content of sodium bisulfite in the solution reaches a supersaturated concentration;
6) separation of target product: transferring the suspension obtained in step 5) into the centrifuge to undergo separation by the centrifuge to obtain a wet product and a mother liquor of saturated sodium bisulfite; and
7) drying and packaging: drying and packaging the wet product obtained in step 6) to obtain a sodium metabisulfite product.

A method for preparing sodium sulfite by using the foregoing device is provided, including the following steps:

1) preparation of main absorption liquid: preparing a thick slurry with a temperature of 45-57° C. and a relative density of 1.28-1.35 in the concentrated alkali tank from desalted water and sodium carbonate when the device runs for the first time or after a major repair; and preparing a thick slurry with a temperature of 42-57° C. and a relative density of 1.45-1.55 in the concentrated alkali tank by using a mother liquor of saturated sodium sulfite as a solvent and sodium carbonate as a solute in the normal production process, and supplementing the insufficient solvent with steam condensate, desalted water, etc.;
2) preparation of auxiliary absorption liquid: dissolving sodium carbonate with desalted water and condensed water from a drying system to prepare a dilute lye with a temperature of 42-57° C. and a relative density of 1.25-1.33 in a dilute alkali tank;
3) production of intermediate slurry: transferring the prepared slurry in step 1) into the first-stage reactor of the column reactor by using a concentrated alkali pump to undergo counter-current contact reaction with $SO_2$ raw material gas to produce an intermediate slurry of sodium sulfite and sodium bisulfite;
4) re-absorption of residual $SO_2$ gas: transferring the dilute lye prepared in step 2) into the second-stage reactor of the column reactor by using a dilute alkali pump to react with residual gas from the first-stage reactor (51), reducing the volume concentration of $SO_2$ in the residual gas from the first-stage reactor (51) to 2% or less, transferring the absorption liquid in the second-stage reactor into the mother liquor tank by using a second-stage circulating pump when the pH value thereof is reduced to 6.8-7.8, and then turning on a dilute alkali pump and adding the same amount of absorption liquid into the second-stage reactor;
5) preparation of target product slurry: transferring the intermediate slurry obtained in step 3) into the mother liquor tank, preparing a sodium sulfite solution with a relative density of 1.32-1.62 and a pH value of 8-12 in the concentrated alkali tank from the slurry in the mother liquor tank, a lye in the alkali storage A, and fresh desalted water; and for the adjustment of pH, usually adjusting the pH value of the slurry to 6-8 with solid sodium carbonate or adjusting the pH value of the slurry to 6-8 with a concentrated sodium carbonate slurry with a mass concentration of 15-35%, and then adjusting the pH value to 8-12 with a sodium hydroxide solution with a mass concentration of 20-30%;
6) concentration and crystallization of target product: transferring the suspension obtained in step 5) into the bubbling reactor by using the concentrated alkali pump for cooking with a cooking temperature controlled to 50-75° C. or 98-105° C. and a gas-phase space pressure in the bubbling reactor controlled to an absolute pressure of 15-40 kPa or 100-120 kPa, until the relative density of the slurry in the bubbling reactor reaches 1.48-1.96 and the volume content of crystal particles larger than 150 mesh in the slurry reaches 20-50%;
7) separation of target product: transferring the suspension obtained in step 6) into the centrifuge to undergo separation by the centrifuge to obtain a wet product and a mother liquor of saturated sodium sulfite; and
8) drying and packaging: drying and packaging the wet product obtained in step 7) to obtain a sodium sulfite product.

In the foregoing methods, mass transfer and heat transfer of gas and liquid phases in the first-stage reactor and the second-stage reactor are achieved through pump circulation.

In the foregoing methods, the bubbling reactor is configured with a stirring paddle, a water cooling system, a heating system, and even a vacuumizing system.

In the foregoing methods, gas-phase substances and liquid-phase substances are in counter-current contact in the methods.

In the foregoing methods, the dry gas is a low-oxygen nitrogen-rich mixed gas or nitrogen, and the dry gas is recycled.

In the foregoing methods, the condensate separated from the dry gas can be recycled and used as a raw material of the upstream system.

Beneficial effects of the present invention are as follows:

1. In the conventional sodium metabisulfite or sodium sulfite production process (referred to as the conventional process below), $SO_2$ and sodium carbonate react in a three-stage bubbling reactor in series, which has a unit product power consumption of 235-280 kWh. However, in the process (for preparing sodium metabisulfite or sodium sulfate) of this application, a one-stage bubbling reactor is used with small gas pressure loss and low energy consumption, which usually has a unit product power consumption of 135-160 kWh.

2. The content of sulfate in the target product is low, the oxidation rate of sulfite in the drying process is almost zero, and the oxidation rate of S(IV) during the reaction is only 1% to 5% of that of the conventional process.

3. The mother liquor has a higher cycle usage frequency. In the conventional process, the mother liquor has a usage frequency of 800-1200 times. In the process (for preparing sodium metabisulfite or sodium sulfate) of the present invention, the cycle frequency can reach 15,000 times or more.

4. In the present invention, the purity of the primary target product is 98.5-99.3%, which is two to three percentage points higher than that of the conventional process product, and the storage period is 1.5-3 times that of the conventional process product.

5. In the present invention, sodium metabisulfite can be produced by using environmental protection by-product $SO_2$-containing waste as a source material, and the acquisition of sulfur element basically does not require cost. In addition, the gas phase pressure loss of the system is small, and the product unit comprehensive energy consumption is only about 60% of that of the conventional process. Moreover, the unit system capacity of this process can reach 30-80 kt/a, which is much higher than the maximum unit system capacity 10-15 kt/a of the conventional process, and the production cost is lower.

6. One set of process equipment can have various by-products, which can better meet the needs of the market.

BRIEF DESCRIPTION OF THE DRAWINGS

FIG. 1 is a schematic flowchart of a process device according to the present invention.

11. Bubbling reactor; 21. Centrifuge; 22. Wet silo; 23. Dryer feeder; 24. Mother liquor tank; 31. Concentrated alkali tank; 32. Stirrer B; 33. Alkali storage A; 34. Concentrated alkali pump; 41. Dilute alkali tank; 42. Stirrer A; 43. Alkali storage B; 44. Dilute alkali pump; 5. Column reactor; 51. First-stage reactor; 52. First-stage circulating pump; 53. First-stage gas-liquid mixer; 61. Second-stage reactor; 62. Second-stage circulating pump; 63. Second-stage gas-liquid mixer; 71. Induced draft fan; 72. Cooler; 73. Heater; 74. Dryer; 75. Baghouse dust collector; 76. Finished product silo; 91. $SO_2$ raw material gas; 92. Residual gas outlet; and 93. Desalted water tube.

DETAILED DESCRIPTION

The present invention is further described below with reference to examples, but the protection scope of the present invention is not limited thereto.

A device for preparing sulfite is provided, where output ends of a mother liquor tank (24) and an alkali storage A (33) are connected to a concentrated alkali tank (31), a liquid-phase output end of the concentrated alkali tank (31) is connected to a first-stage reactor (51) of a column reactor (5), a liquid-phase output end of the first-stage reactor (51) is connected to an inlet end of a first-stage circulating pump (52), an output end of the first-stage circulating pump (52) is divided into three routes, the first route is connected to a first-stage gas-liquid mixer (53), an output end of the second route is connected to a bubbling reactor (11), and an output end of the third route is connected to the mother liquor tank (24), a gas output end at the top or side top of the bubbling reactor (11) is connected to a gas-phase input end of the first-stage gas-liquid mixer (53), the first-stage gas-liquid mixer (53) is also connected to the top of the first-stage reactor (51), a gas-phase output end of the first-stage reactor (51) is connected to a second-stage gas-liquid mixer (63), a liquid-phase output end of a second-stage reactor (61) is connected to an inlet end of a second-stage circulating pump (62), and an output end of the second-stage circulating pump (62) is divided into three routes, the first route is connected to the second-stage gas-liquid mixer (63), an output end of the second route is connected to the bubbling reactor (11), and an output end of the third route is connected to the mother liquor tank (24).

A liquid-phase output end of the bubbling reactor (11) enters a centrifuge (21) or the mother liquor tank (24), a solid output end of the centrifuge (21) is connected to a wet silo (22), and a liquid output end of the centrifuge (21) is connected to the mother liquor tank (24); and a solid-phase output end of the wet silo (22) is connected to a dryer (74), an output end at the top of the dryer (74) is connected to a baghouse dust collector (75), and an output end at the bottom of the baghouse dust collector (75) outputs a target product.

A gas-phase output end of the baghouse dust collector (75) is connected to a cooler (72) by an induced draft fan (71), a gas output pipeline of the cooler (72) is connected to the bottom of the dryer (74) by a heater (73), a liquid output pipeline of the cooler (72) is connected to a dilute alkali tank (41), and an output end of the dilute alkali tank (41) is connected to the second-stage reactor (61).

The dilute alkali tank (41) is provided with a stirrer A (42), the concentrated alkali tank (31) is provided with a stirrer B (32), a solid-phase output end of the alkali storage A (33) is connected to the concentrated alkali tank (31), and an alkali storage B (43) is connected to the dilute alkali tank (41); and the bubbling reactor (11) is configured with all or any of a stirring paddle, a water cooling system, a heating system, and a vacuumizing system.

Example 1

1) preparation of main absorption liquid: a thick slurry with a temperature of 45-57° C. and a relative density of 1.28-1.35 was prepared in the concentrated alkali tank from desalted water and sodium carbonate when the device ran for the first time or after a major repair; and a thick slurry with a temperature of 42-57° C. and a relative density of 1.45-1.55 was prepared in the concentrated alkali tank by using a mother liquor of saturated sodium bisulfite as a solvent and sodium carbonate as a solute in the normal production process;

2) preparation of auxiliary absorption liquid: sodium carbonate was dissolved with desalted water and condensed water from a drying system to prepare a dilute lye with a temperature of 42-57° C. and a relative density of 1.25-1.33 in a dilute alkali tank;

3) production of intermediate slurry: the prepared slurry in step 1) was transferred into the first-stage reactor of the column reactor by using a concentrated alkali pump to undergo counter-current contact reaction with primary residual gas to produce an intermediate slurry of sodium sulfite and sodium bisulfite; 4) re-absorption of residual $SO_2$ gas: the dilute lye prepared in step 2) was transferred into the second-stage reactor of the column reactor by using a dilute alkali pump to react with secondary residual gas, the volume concentration of $SO_2$ in the secondary residual gas was reduced to 2% or less, the absorption liquid in the second-stage reactor 61 was transferred into the mother liquor tank 24 by using a second-stage circulating pump 62 when the pH value thereof was reduced to 6.8-7.8, and then a dilute alkali pump 44 was turned on and the same amount of absorption liquid was added into the second-stage reactor 61;

5) production of target product: the intermediate slurry obtained in step 3) was transferred into the bubbling reactor to react with fresh $SO_2$ raw material gas, and sodium metabisulfite crystals were precipitated when the content of sodium bisulfite in the solution reached a supersaturated concentration, in this case, the pH value of the supersaturated solution was 3.8-4.1;

6) separation of target product: the suspension obtained in step 5) was transferred into the centrifuge to undergo separation by the centrifuge to obtain a wet product and a mother liquor of saturated sodium bisulfite; and 7) drying and packaging: the wet product obtained in step 6) was dried and packaged to obtain a sodium metabisulfite product. The wet product was conveyed to the dryer 74 through a dryer feeder 23. The wet product and a dry gas met and were mixed at the bottom of the dryer 74. The mixed gas flow moved from bottom to top in the dryer 74 and was accompanied by migration of substances. When the mixed gas flow left the dryer 74 from the top of the dryer 74, the wet product finished drying. A target product and dust-free wet gas were separated from the dried mixed gas flow through the baghouse dust collector 75. The target product fell into the bottom of the baghouse dust collector 75. The wet gas was pressurized by the induced draft fan 71 and then entered the cooler 72. The temperature of the gas from the cooler 72 was reduced to 30-45° C. The liquid condensed by the cooler 72 overflowed to the dilute alkali tank 41 through a pipeline liquid. The cooled gas from the cooler 72 was heated to 155-168° C. by the heater 73 and then entered the dryer 74.

Example 2

1) preparation of main absorption liquid: the same as Example 1;

2) preparation of auxiliary absorption liquid: the same as Example 1;

3) production of intermediate slurry: the prepared slurry in step 1) was transferred into the first-stage reactor of the column reactor by using a concentrated alkali pump to undergo counter-current contact reaction with $SO_2$ raw material gas to produce an intermediate slurry of sodium sulfite and sodium bisulfite;

4) re-absorption of residual $SO_2$ gas: the dilute lye prepared in step 2) was transferred into the second-stage reactor of the column reactor by using a dilute alkali pump to react with residual gas from the first-stage reactor (51), the volume concentration of $SO_2$ in the residual gas from the first-stage reactor (51) was reduced to 0.1% or less, the absorption liquid in the second-stage reactor 61 was transferred into the mother liquor tank 24 by using a second-stage circulating pump 62 when the pH value thereof was reduced to 6.8-7.8, and then a dilute alkali pump 44 was turned on and the same amount of absorption liquid was added into the second-stage reactor 61;

5) preparation of target product slurry: the intermediate slurry obtained in step 3) was transferred into the mother liquor tank, a sodium sulfite solution with a relative density of 1.32-1.62 and a pH value of 8-12 was prepared in the concentrated alkali tank from the slurry in the mother liquor tank, a lye in the alkali storage A, and fresh desalted water according to a certain stoichiometric relationship; and for the adjustment of pH, the pH value of the slurry was usually adjusted to 6-8 with solid sodium carbonate or the pH value of the slurry was adjusted to 6-8 with a concentrated sodium carbonate slurry with a mass concentration of 15-35%, and then the pH value was adjusted to 8-12 with a sodium hydroxide solution with a mass concentration of 20-30%;

6) concentration and crystallization of target product: the suspension obtained in step 5) was transferred into the bubbling reactor by using the concentrated alkali pump for cooking with a cooking temperature controlled to 50-75° C. or 98-105° C. and a gas-phase space pressure in the bubbling reactor controlled to an absolute pressure of 15-40 kPa or 100-120 kPa, until the relative density of the slurry in the bubbling reactor reached 1.48-1.96 and the volume content of crystal particles larger than 150 mesh in the slurry reached 20-50%;

7) separation of target product: the suspension obtained in step 6) was transferred into the centrifuge to undergo separation by the centrifuge to obtain a wet product and a mother liquor of saturated sodium sulfite; and 8) drying and packaging: the same as Example 1.

What is claimed is:

1. A method for preparing sodium sulfite by using a device, comprising the following steps wherein the device comprises:

output ends of a mother liquor tank and an alkali storage A connected to a concentrated alkali tank, a liquid-phase output end of the concentrated alkali tank is connected to a first-stage reactor of a column reactor, one output end at the bottom of the first-stage reactor is connected to a first-stage gas-liquid mixer, the other output end is connected to an upper end of a bubbling reactor, a gas output end at the top of the bubbling reactor is connected to the first-stage gas-liquid mixer, the first-stage gas-liquid mixer is also connected to the top of the first-stage reactor, a gas output end at the top of the first-stage reactor and an output end at the bottom of a second-stage reactor are connected to a second-stage gas-liquid mixer, and the second-stage gas-liquid mixer is connected to the top of the second-stage reactor;

a liquid-phase output end of the bubbling reactor is connected to a centrifuge or the concentrated alkali tank, a solid output end of the centrifuge is connected to a wet silo, and a liquid output end of the centrifuge is connected to the mother liquor tank;

an output end of the wet silo is connected to a dryer, a gas-phase output end of the dryer is connected to a baghouse dust collector, and an output end at the bottom of the baghouse dust collector outputs a target product; and the bubbling reactor is configured with all or any one or more of a stirring paddle, a water cooling system, a heating system, and a vacuumizing system 1) preparation of main absorption liquid: preparing a thick slurry with a temperature of 45-57° C. and a relative density of 1.28-1.35 in the concentrated alkali tank from desalted water and sodium carbonate when the device runs for the first time or after a major repair; and preparing a thick slurry with a temperature of 42-57° C. and a relative density of 1.45-1.55 in the concentrated alkali tank by using a mother liquor of saturated sodium sulfite as a solvent and sodium carbonate as a solute in the normal production process;

2) preparation of auxiliary absorption liquid: dissolving sodium carbonate with desalted water and condensed water from a drying system to prepare a dilute lye with a temperature of 42-57° C. and a relative density of 1.25-1.33 in a dilute alkali tank;

3) production of intermediate slurry: transferring the prepared slurry in step 1) into the first-stage reactor of the column reactor by using a concentrated alkali pump to undergo counter-current contact reaction with $SO_2$ raw material gas to produce an intermediate slurry of sodium sulfite and sodium bisulfite;

4) re-absorption of residual $SO_2$ gas: transferring the dilute lye prepared in step 2) into the second-stage reactor of the column reactor by using a dilute alkali pump to react with residual gas from the first-stage reactor, reducing the volume concentration of $SO_2$ in the residual gas from the first-stage reactor to 0.3% or less, transferring the absorption liquid in the second-stage reactor into the mother liquor tank by using a second-stage circulating pump when the pH value thereof is reduced to 6.8-7.8, and then turning on a dilute alkali pump and adding the same amount of absorption liquid into the second-stage reactor;

5) preparation of target product slurry: transferring the intermediate slurry obtained in step 3) into the mother liquor tank, preparing a sodium sulfite solution with a relative density of 1.32-1.62 and a pH value of 8-12 in the concentrated alkali tank from the slurry in the mother liquor tank, a lye in the alkali storage A, and fresh desalted water; and for the adjustment of pH, adjusting the pH value of the slurry to 6-8 with solid sodium carbonate or adjusting the pH value of the slurry to 6-8 with a concentrated sodium carbonate slurry with a mass concentration of 15-35%, and then adjusting the pH value to 8-12 with a sodium hydroxide solution with a mass concentration of 20-30%;

6) concentration and crystallization of target product: transferring the suspension obtained in step 5) into the bubbling reactor by using the concentrated alkali pump for cooking with a cooking temperature controlled to 50-75° C. or 98-105° C. and a gas-phase space pressure in the bubbling reactor controlled to an absolute pressure of 15-40 kPa or 100-120 kPa, until the relative density of the slurry in the bubbling reactor reaches 1.48-1.96 and the volume content of crystal particles larger than 150 mesh in the slurry reaches 20-50%;

7) separation of target product: transferring the suspension obtained in step 6) into the centrifuge to undergo separation by the centrifuge to obtain a wet product and a mother liquor of saturated sodium sulfite; and 8) drying and packaging: drying and packaging the wet product obtained in step 7) to obtain a sodium sulfite product.

2. The method according to claim 1, wherein mass transfer and heat transfer of gas and liquid phases in the first-stage reactor and the second-stage reactor are achieved through pump circulation.

3. The method according to claim 1, wherein gas-phase substances and liquid-phase substances are in counter-current contact in the method.

\* \* \* \* \*